United States Patent
Hua et al.

(10) Patent No.: US 11,234,161 B2
(45) Date of Patent: Jan. 25, 2022

(54) METHOD AND SYSTEM FOR NETWORK SLICE USAGE SERVICE

(71) Applicant: Verizon Patent and Licensing Inc., Washington, DC (US)

(72) Inventors: Suzann Hua, Walnut Creek, CA (US); Ye Huang, San Ramon, CA (US); Jude M. Munn, Pittsburg, CA (US); Parry Cornell Booker, Arlington, TX (US); Miguel A. Carames, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 24 days.

(21) Appl. No.: 16/835,810

(22) Filed: Mar. 31, 2020

(65) Prior Publication Data

US 2021/0306906 A1   Sep. 30, 2021

(51) Int. Cl.
*H04W 16/02* (2009.01)
*H04W 28/02* (2009.01)

(52) U.S. Cl.
CPC ....... *H04W 28/0289* (2013.01); *H04W 16/02* (2013.01)

(58) Field of Classification Search
CPC .......................... H04W 28/0289; H04W 16/02
See application file for complete search history.

(56) References Cited

U.S. PATENT DOCUMENTS

| 2020/0100137 A1* | 3/2020 | Panchal | H04W 48/18 |
| 2020/0112868 A1* | 4/2020 | Shariat | H04W 48/06 |
| 2021/0185695 A1* | 6/2021 | Gupta | H04W 72/087 |

* cited by examiner

*Primary Examiner* — Minh Trang T Nguyen (57) ABSTRACT

A method, a device, and a non-transitory storage medium are described in which a network slice usage service is provided. The network slice usage service may allow a network device to obtain a network slice usage value of a network slice. The network device may be implemented as a network data analytics function (NWDAF). The network slice usage value may be provided by an access and mobility management function (AMF). The network device may calculate a network slice load value based on the network slice usage value. The network device may also provide the network slice load value to other network devices of a core network, such as a network slice selection function (NSSF) and/or a policy control function (PCF).

20 Claims, 6 Drawing Sheets

METHOD AND SYSTEM FOR NETWORK SLICE USAGE SERVICE

BACKGROUND

Development and design of radio access networks (RANs), core networks, and application service networks, present certain challenges from a network-side perspective and an end device perspective. For example, depending on the configurations from both network-side and end device-side perspectives, such configurations (features and services enabled including network slices) may impact various performance metrics, such as accessibility, congestion, latency, throughput, etc. Accordingly, a need exists to overcome these challenges.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Network slicing includes the creation of a sub-network in a network, such as in a Fifth Generation (5G) network or another type of network (e.g., that may support network slicing), and may support an application and/or a service (referred to as an "application service"). With network slicing, an end device may switch between different network slices for different application services to achieve optimal results. For example, if a user of user equipment (UE) wants to make a phone call or use a texting service, the UE may use a network slice that supports voice or text services. However, if the user of the UE wants to watch a high definition (HD) video, for example, the UE may use another network slice (e.g., an enhanced Mobile Broadband (eMBB) slice or other suitable network slice) via which to obtain the HD video service.

As part of this process, an access and mobility management function (AMF) device or a policy control function (PCF) device, may obtain network slice usage information pertaining to the end device. For example, the network slice usage information may indicate a network slice being used by the end device. However, there may be other network devices that could make use of the network slice usage information and improve network slice management, and network and network slice performance, among other things.

According to exemplary embodiments, a network slice usage load service is described. According to an exemplary embodiment, a network device may subscribe to the network slice usage notification service. According to an exemplary embodiment, the network slice usage load service may provide network slice usage load information to a subscribed network device, as described herein. For example, a network data analytics function (NWDAF) device of a core network may subscribe to the network slice usage service. According to an exemplary embodiment, the NWDAF device may subscribe to the network slice usage service with an AMF device for all UEs to obtain and analyze network slice usage load information. According to other exemplary embodiments, another type of network device of the core network and/or a network device of a network external from the core network may subscribe to the network slice usage load service from the NWDAF device. Such subscription may include a specific network slice load threshold to be notified. Different network devices may have different service performance thresholds and/or network slice load thresholds specified in the subscriptions.

According to an exemplary embodiment, the network slice usage information may include a network slice usage value relating to a network slice. For example, when an end device is assigned to and/or is using a network slice, the network slice usage value may be incremented due to the assignment and/or use of the end device to the network slice. Additionally, for example, when an application session of the network slice and an end device are terminated (e.g., the end device disconnects from any and all sessions of the network slice), the network slice usage value may be decremented because the end device no longer using the network slice. In this way, the network slice usage value may indicate a change in the number of end devices using the network slice over a time period. The network slice usage information may also indicate an identifier of the network slice. According to an exemplary embodiment, the AMF device may calculate the network slice usage value and provide the network slice usage information, which may include the network slice identifier and the network slice usage value, to the NWDAF device.

According to an exemplary embodiment, the NWDAF device may calculate a network slice load value for the network slice of relevance based on the network slice usage information. The NWDAF device may determine whether the network slice load value exceeds a network slice threshold load value. According to an exemplary embodiment, the NWDAF device may provide the calculated network slice load value to another network device when the network slice load value exceeds the network slice threshold load value. For example, the NWDAF device may provide the network slice load value to a network slice selection function (NSSF) device and/or a policy control function (PCF) device. The NWDAF device may also determine whether or not the NSSF device and/or the PCF device are subscribed to receive a notification for the network slice. For example, if the NSSF device and/or the PCF device are subscribed, the NWDAF device may provide the network slice load value, and if not, the NWDAF device may not provide the network slice load value to the NSSF device and/or the PCF device.

Figure 1:
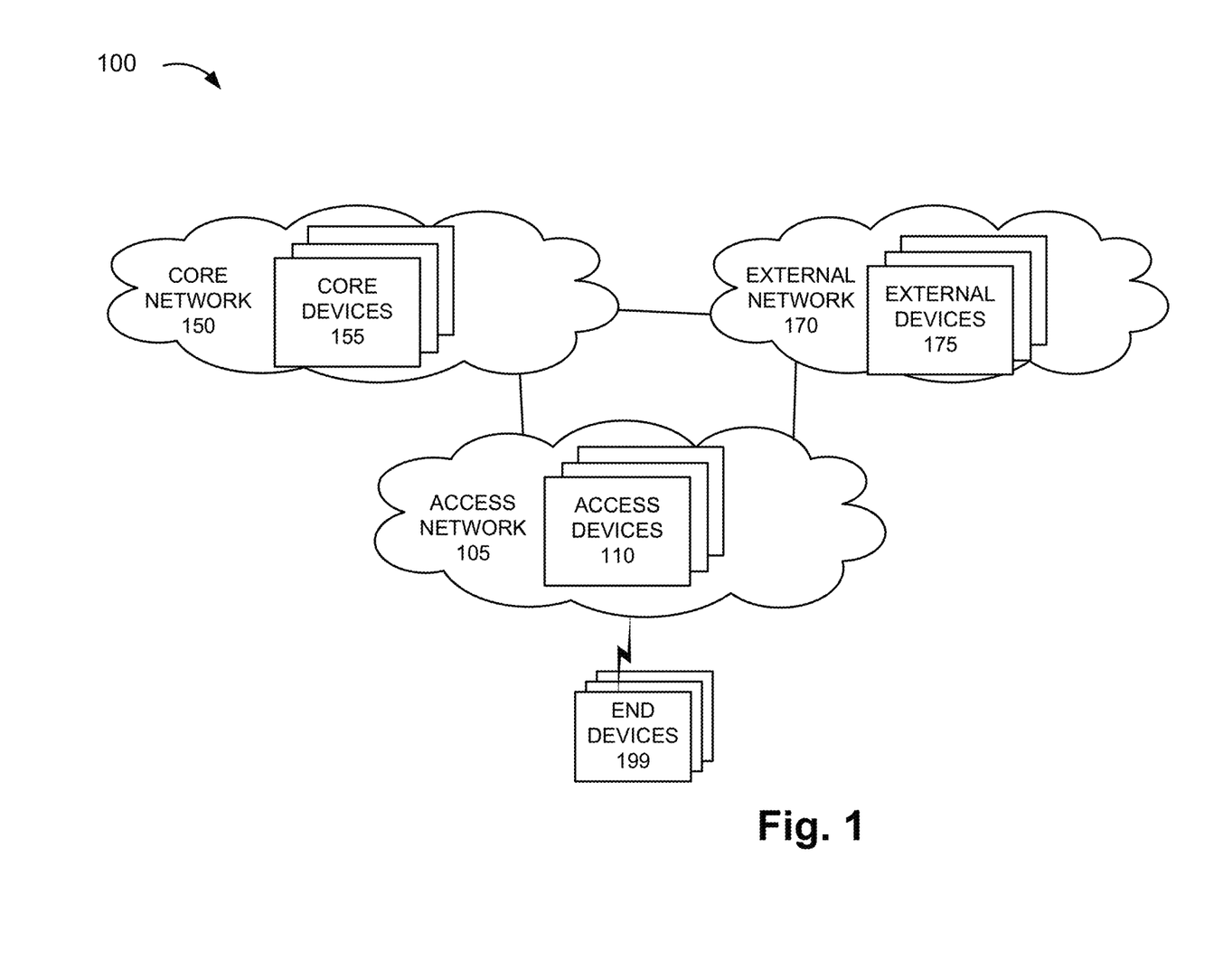
FIG. 1 is a diagram illustrating an exemplary environment in which an exemplary embodiment of a network slice usage service may be implemented.

The network slice usage information may improve network resource usage and various performance metrics in a network. For example, the NWDAF device may assist in the management of congestion, load balancing, network slice management, and traffic management based on the receipt and use of the network slice usage information. Additionally, the NWDAF device may provide information to other network devices, such as the NSSF and/or the PCF, for managing the network, application services, network slices (e.g., selection, etc.), policies (e.g., assignment of network resources policies, traffic steering polices, quality of service (QoS) policies, transfer policies, etc.), and so forth. In addition, the network slice usage load analysis from the NWDAF device may help optimize network resource distribution and future network planning and design, which may include network slices planning and design. Further, the network slice usage information may be provided to northbound systems which may use this information to present the information to operational teams in the form of dashboards, heat maps, and so on. The northbound systems may apply trending and artificial intelligence (AI) methods to further optimize how traffic is allocated to network slices, how network functions serving each network slice are performing and/or are sized, and so forth. Network slice usage information may also be published to a network exposure function (NEF) device, which may be consumed by third parties, for example, and may enable the third parties to select a class of service (CoS) that best suits their objectives FIG. 1 is a diagram illustrating an exemplary environment 100 in which an exemplary embodiment of the network slice usage service may be implemented. As illustrated, environment 100 includes an access network 105, a core network 150, and an external network 170. Access network 105 includes access devices 110, core network 150 includes core devices 155, and external network 170 includes external devices 175. Environment 100 further includes end devices 199.

The number, type, and arrangement of networks illustrated in environment 100 are exemplary. Additionally, or alternatively, other networks not illustrated in FIG. 1 may be included in environment 100, such as a backhaul network, a fronthaul network, or another type of intermediary network, as described herein.

The number, the type, and the arrangement of network devices in access network 105, core network 150, external network 170, as illustrated and described, are exemplary. The number of end devices 199 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the network slice usage service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), etc.) or a new interface of the network device may be provided in order to support the communication (e.g., transmission and reception of messages, information elements (IE), attribute value pairs (AVPs), etc.) between network devices and the network slice usage service logic of the network device, as described herein. According to various exemplary implementations, the interface of the network device may be a service-based interface, a reference point-based interface, an Open Radio Access Network (O-RAN) interface, or some other type of interface.

Access network 105 may include one or multiple networks of one or multiple types and technologies. For example, access network 105 may be implemented to include a next generation RAN (e.g., a Fifth Generation (5G)-access network (5G-AN) or a 5G-RAN (referred to herein as simply a 5G-RAN)), another type of future generation RAN, a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), a RAN of an LTE-A Pro network, and/or another type of RAN (e.g., a legacy Third Generation (3G) RAN, etc.). Access network 105 may further include other types of wireless networks, such as a Wi-Fi network, a Worldwide Interoperability for Microwave Access (WiMAX) network, a local area network (LAN), a Bluetooth network, a personal area network (PAN), a Citizens Broadband Radio System (CBRS) network, or another type of wireless network (e.g., a legacy Third Generation (3G) RAN, etc.). Access network 105 may include a wired network, an optical network, or another type of network that may provide communication with core network 150, for example.

According to various exemplary embodiments, access network 105 may be implemented to include various architectures of wireless service, such as, for example, macrocell, microcell, femtocell, picocell, metrocell, new radio (NR) cell, LTE cell, non-cell, or another type of architecture. Additionally, according to various exemplary embodiments, access network 105 may be implemented according to various wireless technologies (e.g., RATs, etc.), wireless standards, wireless frequencies/bands/carriers (e.g., centimeter (cm) wave, millimeter (mm) wave, below 6 Gigahertz (GHz), above 6 GHz, licensed radio spectrum, unlicensed radio spectrum, etc.), and/or other attributes of radio communication.

Depending on the implementation, access network 105 may include one or multiple types of network devices, such as access devices 110. For example, access devices 110 may include a next generation Node B (gNB), an evolved Node B (eNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), a future generation wireless access device, another type of wireless node (e.g., a WiMax device, a hotspot device, etc.) that provides a wireless access service. According to some exemplary implementations, access device 110 may include a combined functionality of multiple RATs (e.g., 4G and 5G functionality).

Core network 150 may include one or multiple networks of one or multiple types and technologies. According to an exemplary embodiment, core network 150 includes a complementary network of access network 105. For example, core network 150 may be implemented to include an Evolved Packet Core (EPC) of an LTE network, an LTE-A network, an LTE-A Pro network, a next generation core (NGC) network, and/or a future generation network. Core network 150 may include a legacy core network.

Depending on the implementation, core network 150 may include various types of network devices, such as core devices 155. For example, core devices 155 may include a mobility management entity (MME), a packet gateway (PGW), an ePDG, a serving gateway (SGW), a home agent (HA), a General Packet Radio Service (GPRS) support node (GGSN), a home subscriber server (HSS), an authentication, authorization, and accounting (AAA) server, a policy charging and rules function (PCRF), a charging system (CS), a user plane function (UPF), a Non-3GPP Interworking Function (N3IWF), an AMF, a session management function (SMF), a unified data management (UDM) device, a unified data repository (UDR) device, an authentication server function (AUSF), a NSSF, a network repository function (NRF), a PCF, an NWDAF, a network exposure function (NEF), a lifecycle management (LCM) device, and/or an application function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein. Core devices 155 may also include a network device that provides a multi-RAT functionality (e.g., 4G and 5G), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Access network 105 and/or core network 150 may include a public network, a private network, and/or an ad hoc network.

External network 170 may include one or multiple networks. For example, external network 170 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a private network, a public network, a multi-access edge computing (MEC) network (also known as a mobile edge computing), a fog network, or other type of network that hosts an end device application or service.

Depending on the implementation, external network 170 may include various network devices, such as external devices 175. For example, external devices 175 may provide various applications, services, or other type of end device assets, such as servers (e.g., web, application, cloud, etc.), mass storage devices, and/or data center devices. According to various exemplary implementations, the application services may pertain to broadband services in dense areas (e.g., pervasive video, smart office, operator cloud services, video/ photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality, etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, real-time communications (e.g., voice, video conferencing, etc.), and/or messaging (e.g., texting, etc.). External devices 175 may also include network devices that provide other network-related functions, such as network management, load balancing, security, authentication and authorization, policy control, billing, and routing. External network 170 may include a private network and/or a public network.

End device 199 includes a device that has computational and wireless communicative capabilities. Depending on the implementation, end device 199 may be a mobile device, a portable device, a stationary device, a device operated by a user (e.g., UE, etc.), or a device not operated by a user (e.g., an Internet of Things (IoT) device, etc.). For example, end device 199 may be implemented as a smartphone, a mobile phone, a personal digital assistant, a tablet, a netbook, a phablet, a wearable device (e.g., a watch, glasses, etc.), a computer, a device in a vehicle, a gaming device, a music device, an IoT device, or other type of wireless device. End device 199 may be configured to execute various types of software (e.g., applications, programs, etc.). The number and the types of software may vary among end devices 199.

Figure 2A:
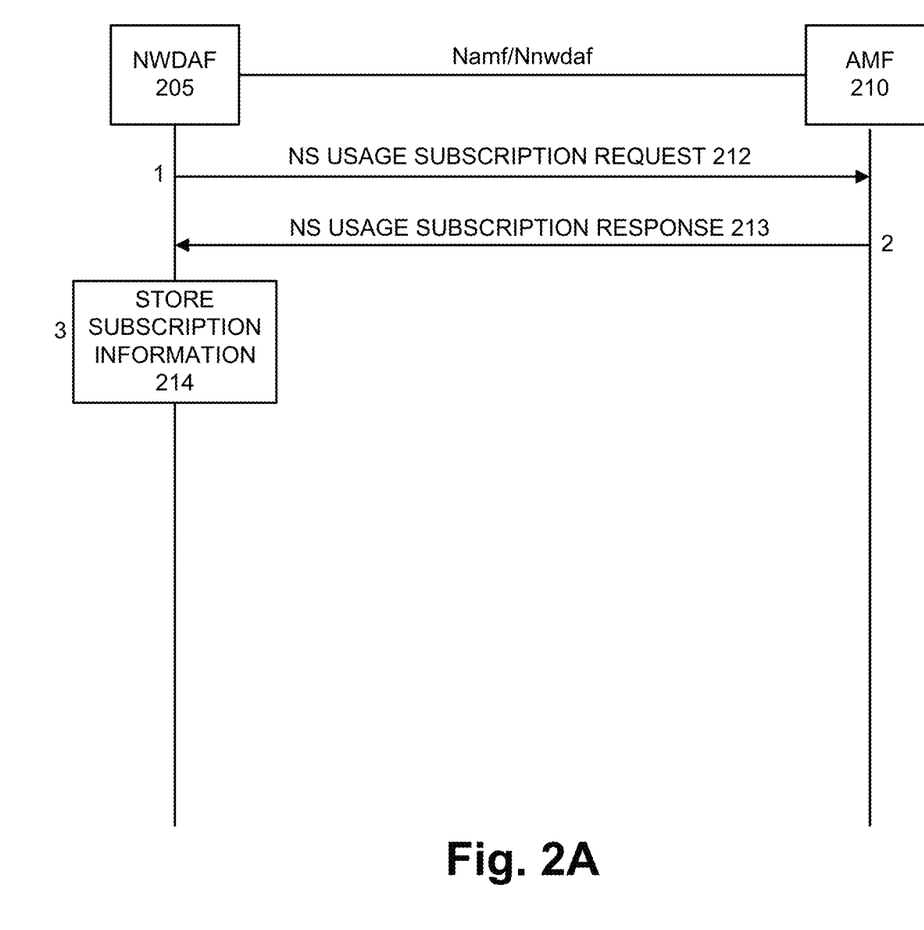
FIG. 2A is a diagram illustrating an exemplary process in which an exemplary embodiment of the network slice usage service may be implemented.

FIG. 2A is a diagram illustrating an exemplary process of the network slice usage service. For example, the process may relate to an on-boarding of the network slice usage service by a network device. According to this example, an NWDAF 205 may subscribe to the network slice usage service. Additionally, according to this example, NWDAF 205 and AMF 210 may communicate with each other via modified or new Namf/Nnwdaf interfaces as a part of the on-boarding procedure (e.g., sign-up for the network slice usage service). The messages described are exemplary. The operations performed by NWDAF 205 and AMF 210 are also exemplary.

Referring to FIG. 2A, in step (1), NWDAF 205 may generate and transmit a network slice usage subscription request 212 to AMF 210. The request may include information to support an on-boarding process for the network slice usage service. For example, the request 212 may include an identifier of NWDAF 205 and a request to subscribe to the network slice usage service. The request 212 may include other relevant information that may be configurable. In response to the receiving the request 212, in step (2), AMF 210 may generate and transmit a network slice usage subscription response 213 to NWDAF 205. The response 213 may include subscription information. For example, the subscription information may include S-NSSAIs and/or NSI-IDs, which may identify network slices, and characteristic information pertaining to those network slices (e.g., type of application service supported by a network slice, etc.). In response to receiving the response 213, in step (3), NWDAF 205 may store the subscription information 214. NWDAF 205 may also obtain and store information relating to other network devices, such as an NSSF device and/or a PCF device. For example, the information may indicate that the NSSF device and/or the PCF device are subscribed to a network slice load notification service.

FIG. 2A illustrates exemplary messaging for the process of the network slice usage service, according to other exemplary embodiments, the process may include additional and/or different messages which may be communicated. For example, there may be communications related to authentication, authorization, and/or other type of security measure. Additionally, or alternatively, according to other exemplary embodiments, additional and/or different network devices may be involved in such communications. Further, according to other exemplary embodiments, the operations performed by a network device may be different and/or involve a different network device than those illustrated in FIG. 2A.

Figure 2B:
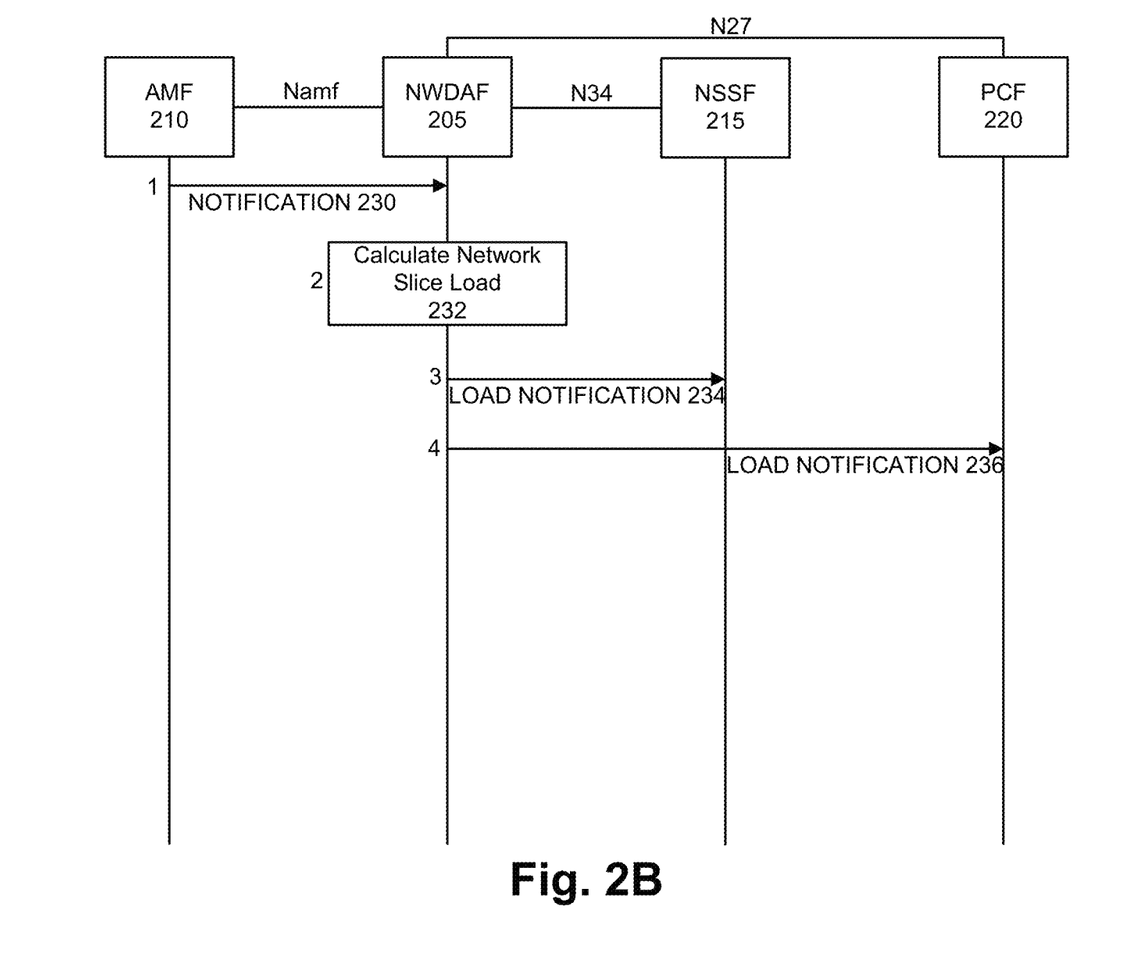
FIG. 2B is a diagram illustrating another exemplary process in which an exemplary embodiment of the network slice usage service may be implemented.

FIG. 2B is a diagram illustrating an exemplary process of the network slice usage service. For example, the process may include a signaling procedure between NWDAF 205 and other network devices of a core network, such as AMF 210, an NSSF 215, and a PCF 220. According to other exemplary embodiments, the network devices and/or the signaling procedure may be different. For example, AMF 210 may be implemented as a combined network device with an MME (AMF+MME), or PCF 220 may be implemented as a combined network device with a PRCF (PCF+PRCF) or another type of policy device. The messages described are exemplary. The process may relate to an event notification service and a network slice load notification service of the network slice usage service.

Messages between AMF 210 and NWDAF 205 may be communicated via the modified or new Namf interface; messages between NWDAF 205 and NSSF 215 may be communicated via a modified or new N34 interface; and messages between NWDAF 205 and PCF 220 may be communicated via a modified or new N27 interface. As previously mentioned, the various interfaces may support the transmission and reception of messages in support of the network slice usage service. The various interfaces may include a modification to a standard interface (e.g., 3GPP, etc.) or constitute a new interface. Additionally, the interfaces are also exemplary and other types of interfaces, such as a modified or new service-based interface (e.g., Nnssf, Nnwdaf, etc.,), a modified or new point-to-point interface, etc., may be used as previously mentioned.

As described herein, NWDAF 205, AMF 210, NSSF 215, and PCF 220 may provide functions and operate according to various standards (e.g., 3GPP, ITU, ETSI, etc.), which have been omitted for the sake of brevity. Additionally, NWDAF 205, AMF 210, NSSF 215, and PCF 220 may provide a function and communications which are beyond those functions and communications of the standard in support of the network slice usage service.

Referring to FIG. 2B, in step (1), AMF 210 may generate and transmit a notification 230 to NWDAF 205 via the Namf interface. Notification 230 may include a network slice identifier (e.g., S-NSSAI, NSI ID, etc.). Notification 230 may include a network slice usage value for the network slice. For example, the network slice usage value may indicate an additive value of change of usage, a decremental value of change of usage, or a null value of change of usage. The additive value, the decremental value, or the null value may relate to a change in the number of end devices 199 using the network slice. As an example, AMF 210 may be assigning end device 199 to a network slice for use, and also be notified when end device 199 is no longer using the network slice (e.g., disconnects from all application service sessions supported by the network slice). AMF 210 may generate and transmit the notification 230 to NWDAF 205 based on, for example, a push notification schedule and/or another type of trigger configuration.

In step (2), in response to receiving notification 230, NWDAF 205 may calculate a network slice load 232 for the network slice to which the notification 230 pertains. NWDAF 205 may use stored network slice usage information to calculate a current network slice load value. According to an exemplary embodiment, when the current network slice load value exceeds a network slice threshold load value, NWDAF 205 may inform other network devices. For example, in step (3), NWDAF 205 may generate and transmit a load notification 234 to NSSF 215 via the N34 interface. However, according to an exemplary embodiment, when the current network slice load value does not exceed the network slice threshold load value, NWDAF 205 may not inform other network devices. According to an exemplary embodiment, NWDAF 205 may confirm that another network device is subscribed to the network slice load notification service of the network slice usage service. For example, NWDAF 205 may confirm that NSSF 215 subscribed to the network slice load notification service and/or that NSSF 215 subscribed to the network slice load notification service for the network slice of relevance. Otherwise, NDWAF 205 may not generate and transmit the load notification 234 to NSSF 215.

In step (4), based on the calculation of the current network slice load value, NWDAF 205 may generate and transmit a load notification 236 to PCF 220 via the N27 interface. Similarly with NSSF 215, NWDAF 205 may confirm that PCF 220 subscribed to the network slice load notification service and/or that NSSF 215 subscribed to the network slice load notification service for this network slice. Based on the network slice load notifications 234 and/or 236, NSSF 215 and/or PCF 220 may perform various operations that may manage and optimize the network slice, policies, and/or other parameters of the network.

FIG. 2B illustrates exemplary messaging for the process of the network slice usage service, according to another exemplary embodiment, the process may include additional and/or different messages which may be communicated. Further, according to other exemplary embodiments, the operations performed by a network device may be different and/or involve a different network device than those illustrated in FIG. 2B.

According to an exemplary embodiment, the network slice usage service may include subscription information. For example, referring to a table 300 in FIG. 3, exemplary network slice usage information is illustrated. According to an exemplary embodiment, the network slice usage information may be stored by or accessible by NWDAF 205. Table 300 may include a network slice identifier field 305, an attribute field 310, and a network slice load field 315. As further illustrated, table 300 includes entries 330-1 through 330-X (also referred as entries 330, or individually or generally as entry 330) that each includes a grouping of fields 305, 310, and 315 that are correlated (e.g., a record, etc.). The network slice usage information is illustrated in tabular form merely for the sake of description. In this regard, the network slice usage information may be implemented in a data structure different from a table (e.g., a list, a flat file, etc.), a database, or other type of data file. The subscription information may include fields 305 and 310. NWDAF 205 may further calculate and store network slice load values in network slice load field 315.

Figure 3:
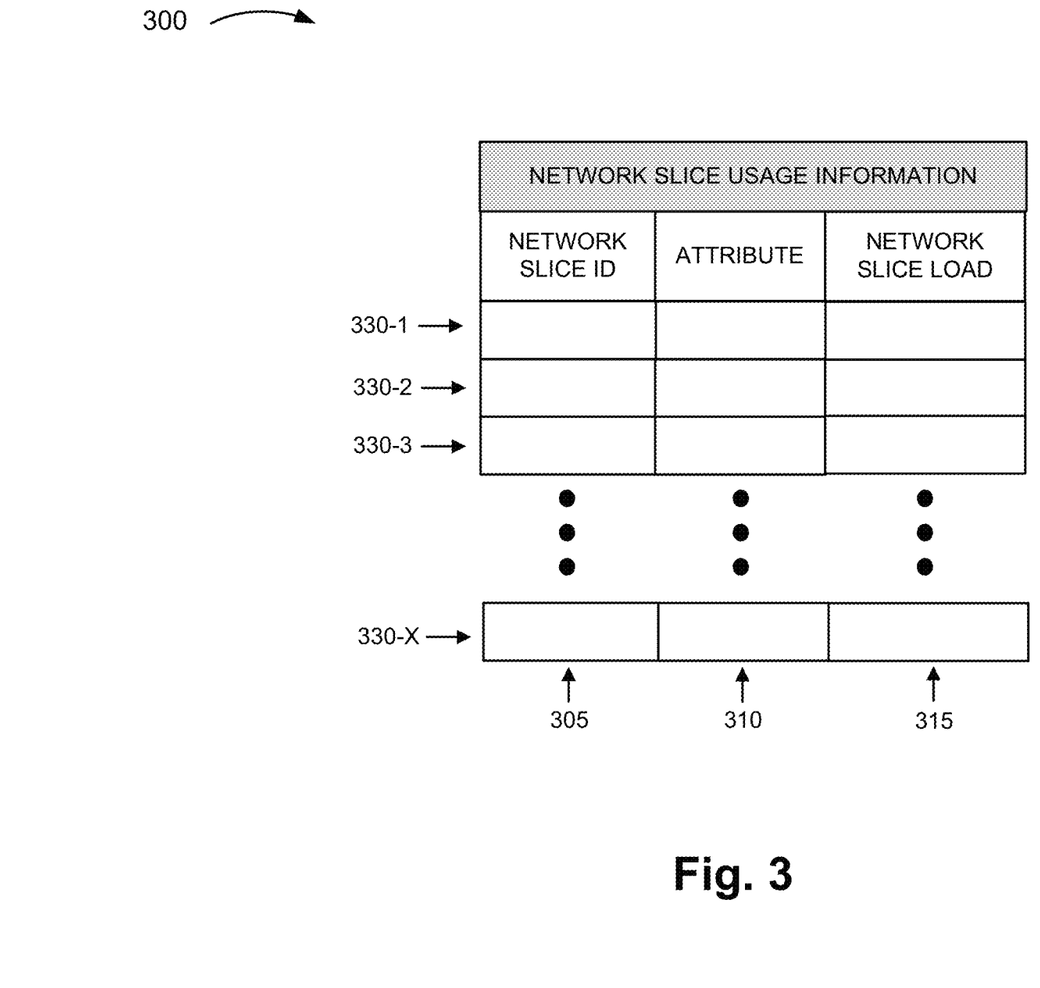
FIG. 3 is a diagram illustrating exemplary network slice usage information of an exemplary embodiment of the network slice usage service.

Network slice identifier field 305 may store an identifier of a network slice. For example, network slice identifier field 305 may store a Single-Network Slice Selection Assistance Information (S-NSSAI), a Network Slice Instance Identifier (NSI ID), or some other type of network slice identifier pertaining to a network slice.

Attribute field 310 may store a characteristic pertaining to a network slice. For example, attribute field 310 may store information that indicates an application service that the network slice supports. For example, attribute field 310 may indicate a category of an application service (e.g., real-time, non-real time, mission critical, video streaming, IoT, delay tolerant, massive IoT (MIoT), eMBB, etc.), a specific name of an application service (e.g., Firefox, etc.), or other types of information (e.g., network slice templates, slice/service type (SSI), etc.). Network slice load field 315 may store a network slice load value.

According to other exemplary implementations, table 300 may store additional, fewer, and/or different instances of network slice usage information in support of the network slice usage service, as described herein.

Figure 4:
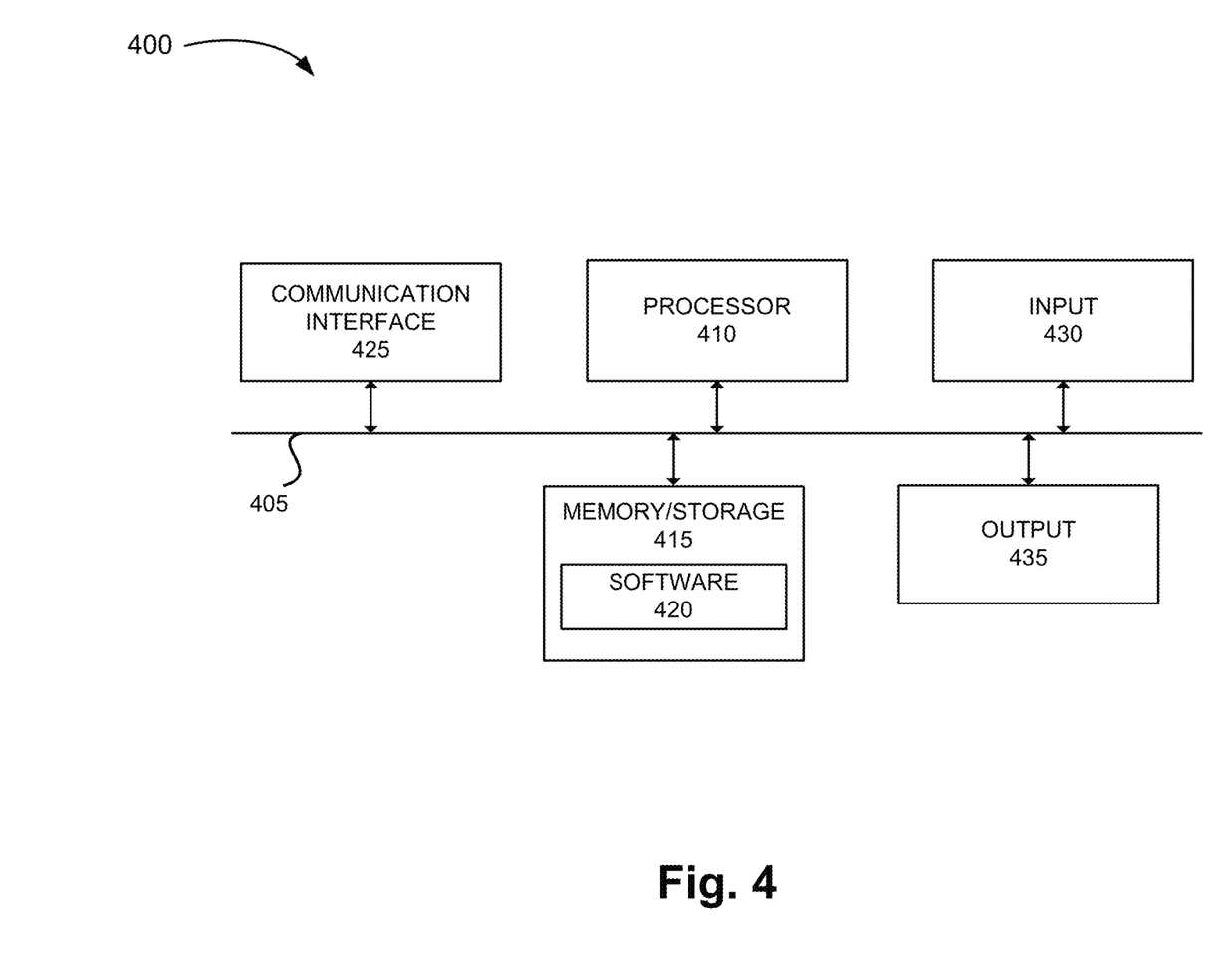
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access devices 110, core devices 155, external devices 175, end devices 199, NWDAF 205, AMF 210, NSSF 215, PCF 220, and other types of network devices or logic, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to NWDAF 205, software 420 may include an application that, when executed by processor 410, provides a function of the network slice usage service, as described herein. Additionally, for example, with reference to AMF 210, NSSF 215, and PCF 220, software 420 may include an application that, when executed by processor 410, provides a function of the network slice usage service. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc., as previously described. Communication interface 425 may be implemented to include logic that supports the network slice usage service, such as the transmission and reception of messages, as described herein.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 5:
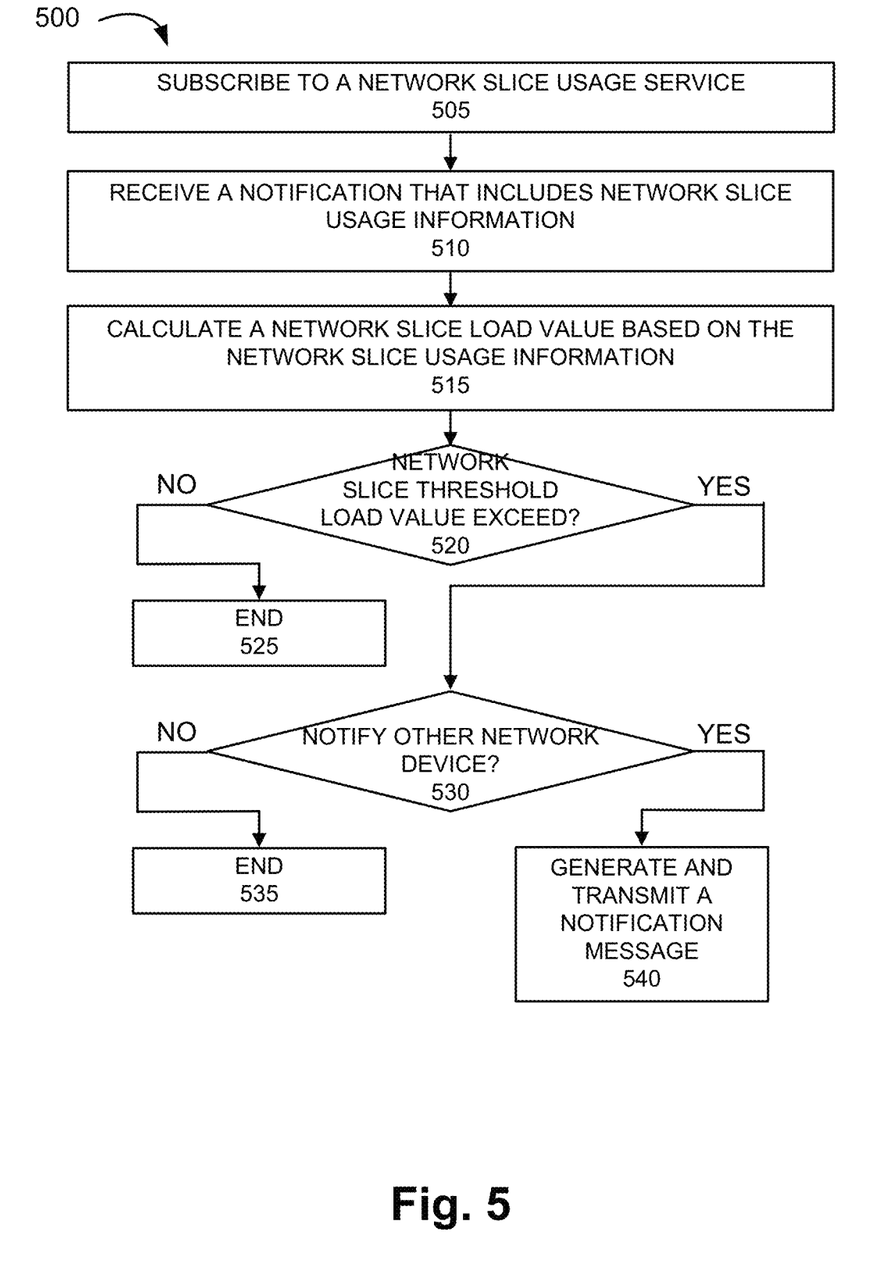
FIG. 5 is a flow diagram illustrating an exemplary process of an exemplary embodiment of the network slice usage service.

FIG. 5 is a flow diagram illustrating an exemplary process 500 of an exemplary embodiment of the network slice usage service. According to an exemplary embodiment, NWDAF 205 may perform steps of process 500. According to an exemplary implementation, processor 410 executes software 420 to perform a step illustrated in FIG. 5, and described herein. Alternatively, a step illustrated in FIG. 5 and described herein, may be performed by execution of only hardware.

Referring to FIG. 5, in block 505, NWDAF 205 may subscribe to the network slice usage service. For example, NWDAF 205 may subscribe to this service based on communication with AMF 210. NWDAF 205 may store subscription information as a part of the subscription procedure, as described herein.

In block 510, NWDAF 205 may receive a notification from AMF 210. The notification may include network slice usage information. The network slice usage information may include a network slice identifier, which identifies a network slice, and a network slice usage change value. For example, the network slice usage change value may be an additive value, a decremental value, or a null value (e.g., no change).

In block 515, NWDAF 205 may calculate a network slice load value based on the network slice usage information. For example, NWDAF 205 may use the network slice usage change value in combination with a network slice load value stored in field 315 of table 300 to calculate a current network slice load value of a network slice. According to other examples, NWDAF 205 may calculate the current network slice load value based on other known methodologies. NWDAF 205 may use other types of information collected from, for example, access device 110, another core device 155 (e.g., a UPF, etc.), an AF device, and/or a traffic aggregation point of relevance to the network slice.

In block 520, NWDAF 205 may compare the calculated network slice load value to a network slice threshold load value, and determine whether the network slice threshold load value is exceeded. When it is determined that the network slice threshold load value is not exceeded (block 520-NO), process 500 may end (block 525). For example, NWDAF 205 may store the calculated network slice load value in field 315 of table 300.

When it is determined that the network slice threshold load value is exceeded (block 520-YES), NWDAF 205 may determine whether to notify another network device (block 530). For example, NWDAF 205 may analyze whether an NSSF device or a PCF device is supposed to receive a network slice load notification. When it is determined that there is not another network device to notify (block 530-NO), process 500 may end (block 535). For example, NWDAF 205 may not notify the NSSF device and/or the PCF device.

When it is determined that there is another network device to notify (block 530-YES), NWDAF 205 may generate and transmit a notification message (block 540). For example, NWDAF 205 may generate and transmit a load notification message to the NSSF device and/or the PCF device. The load notification message may include the calculated network slice load value and a network slice identifier. The load notification message may also indicate that the network slice threshold load value has been exceeded.

FIG. 5 illustrates an exemplary process 500 of the network slice usage service, however, according to other embodiments, process 500 may include additional operations, fewer operations, and/or different operations than those illustrated in FIG. 5, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    storing, by a network device, network slice usage information that includes network slice identifiers, and attribute information pertaining to network slices identified by the network slice identifiers, wherein the attribute information includes data indicating one or multiple application services supported by the network slices;
    receiving, by the network device and from a first network device of a core network, a first message that includes a network slice usage change value pertaining to a network slice of the network slices, wherein the network slice usage change value indicates a change in a number of end devices using the network slice over a time period; and
    calculating, by the network device, a network slice load value of the network slice based on the first message and the network slice usage information.

2. The method of claim 1, wherein the network device is a network data analytics function (AF) device of the core network, and the method further comprising:
    subscribing, by the network device prior to the storing of the network slice usage information, to a network slice usage service with the first network device; and
    receiving, by the network device from the first network device, the network slice usage information.

3. The method of claim 1, wherein the network slice usage value includes an additive value, a decremental value, or a null value corresponding to the change in the number of the end devices using the network slice.

4. The method of claim 1, wherein the first network device includes an access and mobility management function (AMF) device, and the first message is received via a modified Namf interface.

5. The method of claim 1, further comprising:
    comparing, by the network device, the network slice load value to a network slice threshold load value; and
    determining, by the network device based on the comparing, whether the network slice load value exceeds the network slice threshold load value.

6. The method of claim 5, further comprising:
    generating, by the network device, a second message that includes the network slice load value when the network slice load value exceeds the network slice threshold load value; and
    transmitting, by the network device, the second message to at least one of a policy control function (PCF) device or a network slice selection function (NSSF) device.

7. The method of claim 6, wherein the second message is transmitted via at least one of a modified N34 interface or a modified N27 interface.

8. The method of claim 6, further comprising:
    determining, by the network device, whether the at least one of the PCF device or the NSSF device are subscribed to receive the second message.

9. A network device comprising:
    a processor, wherein the processor is configured to:
        store network slice usage information that includes network slice identifiers, and attribute information pertaining to network slices identified by the network slice identifiers, wherein the attribute information includes data indicating one or multiple application services supported by the network slices;
        receive, from a first network device of a core network, a first message that includes a network slice usage change value pertaining to a network slice of the network slices, wherein the network slice usage change value indicates a change in a number of end devices using the network slice over a time period; and
        calculate a network slice load value of the network slice based on the first message and the network slice usage information.

10. The network device of claim 9, wherein the network device is a network data analytics function (AF) device of the core network, and the processor is further configured to:
    subscribe, prior to the storage of the network slice usage information, to a network slice usage service with the first network device; and receive, from the first network device, the network slice usage information.

11. The network device of claim 9, wherein the network slice usage change value includes an additive value, a decremental value, or a null value corresponding to the change in the number of the end devices using the network slice.

12. The network device of claim 9, wherein the first network device includes an access and mobility management function (AMF) device, and the first message is received via a modified Namf interface.

13. The network device of claim 9, wherein the processor is further configured to:
   compare the network slice load value to a network slice threshold load value; and
   determine, based on the comparison, whether the network slice load value exceeds the network slice threshold load value.

14. The network device of claim 13, wherein the processor is further configured to:
   generate a second message that includes the network slice load value when the network slice load value exceeds the network slice threshold load value; and
   transmit the second message to at least one of a policy control function (PCF) device or a network slice selection function (NSSF) device.

15. The network device of claim 14, wherein the second message is transmitted via at least one of a modified N34 interface or a modified N27 interface.

16. The network device of claim 14, wherein the processor is further configured to:
   determine whether the at least one of the PCF device or the NSSF device are subscribed to receive the second message.

17. A non-transitory computer-readable storage medium storing instructions executable by a processor of a network device, which when executed cause the network device to:
   store network slice usage information that includes network slice identifiers, and attribute information pertaining to network slices identified by the network slice identifiers, wherein the attribute information includes data indicating one or multiple application services supported by the network slices;
   receive, from a first network device of a core network, a first message that includes a network slice usage change value pertaining to a network slice of the network slices, wherein the network slice usage change value indicates a change in a number of end devices using the network slice over a time period; and
   calculate a network slice load value of the network slice based on the first message and the network slice usage information.

18. The non-transitory computer-readable storage medium of claim 17, wherein the network slice usage change value includes an additive value, a decremental value, or a null value corresponding to the change in the number of the end devices using the network slice.

19. The non-transitory computer-readable storage medium of claim 17, wherein the instructions further comprise instructions to:
   compare the network slice load value to a network slice threshold load value; and
   determine, based on the comparison, whether the network slice load value exceeds the network slice threshold load value, wherein the second message is transmitted via at least one of a modified N34 interface or a modified N27 interface.

20. The non-transitory computer-readable storage medium of claim 19, wherein the instructions further comprise instructions to:
   generate a second message that includes the network slice load value when the network slice load value exceeds the network slice threshold load value; and
   transmit the second message to at least one of a policy control function (PCF) device or a network slice selection function (NSSF) device, wherein the second message is transmitted via at least one of a modified N34 interface or a modified N27 interface.

* * * * *